United States Patent
Schwartz

(10) Patent No.: US 9,985,270 B2
(45) Date of Patent: May 29, 2018

(54) THIN FILM RESERVE BATTERY

(71) Applicant: Palo Alto Research Center Incorporated, Palo Alto, CA (US)

(72) Inventor: David E. Schwartz, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 52 days.

(21) Appl. No.: 15/197,230

(22) Filed: Jun. 29, 2016

(65) Prior Publication Data

US 2018/0006287 A1    Jan. 4, 2018

(51) Int. Cl.

| | |
|---|---|
| H01M 2/34 | (2006.01) |
| H01M 2/26 | (2006.01) |
| H01M 2/16 | (2006.01) |
| H01M 4/90 | (2006.01) |
| H01M 12/08 | (2006.01) |
| H01M 4/50 | (2010.01) |
| H01M 4/88 | (2006.01) |
| H01M 6/38 | (2006.01) |
| H01M 6/40 | (2006.01) |
| H01M 4/02 | (2006.01) |
| H01M 6/22 | (2006.01) |
| H01M 12/06 | (2006.01) |

(52) U.S. Cl.
CPC .......... *H01M 2/34* (2013.01); *H01M 2/1673* (2013.01); *H01M 2/26* (2013.01); *H01M 4/50* (2013.01); *H01M 4/8814* (2013.01); *H01M 4/9016* (2013.01); *H01M 6/385* (2013.01); *H01M 6/40* (2013.01); *H01M 12/08* (2013.01); *H01M 2/1626* (2013.01); *H01M 6/22* (2013.01); *H01M 12/06* (2013.01); *H01M 2004/028* (2013.01); *H01M 2220/30* (2013.01); *H01M 2300/0085* (2013.01)

(58) Field of Classification Search
CPC ............ H01M 6/40; H01M 2/34; H01M 4/50; H01M 2/1673; H01M 2/26; H01M 12/08; H01M 4/9016; H01M 2300/0085; H01M 2004/028; H01M 2220/30
See application file for complete search history.

(56) References Cited

U.S. PATENT DOCUMENTS

| | | | |
|---|---|---|---|
| 5,100,746 A * | 3/1992 | Muller | H01M 6/181 29/623.3 |
| 5,840,087 A * | 11/1998 | Gozdz | H01M 10/0404 156/182 |
| 6,030,421 A * | 2/2000 | Gauthier | H01M 10/052 29/623.1 |
| 6,605,391 B2 | 8/2003 | Chen et al. | |
| 6,800,393 B2 | 10/2004 | Faris | |
| 2002/0177036 A1 | 11/2002 | Faris | |
| 2008/0008930 A1* | 1/2008 | Matsumoto | C07F 5/02 429/122 |
| 2009/0162743 A1 | 6/2009 | Nam et al. | |
| 2013/0280611 A1 | 10/2013 | Alkordi et al. | |

(Continued)

*Primary Examiner* — Carlos Barcena
(74) *Attorney, Agent, or Firm* — Hollingsworth Davis LLC

(57) ABSTRACT

A single-electrode battery subassembly includes a separator comprising an electrolyte. The separator has a first surface and an opposing second surface. A single electrode is disposed over the first surface of the separator. A removable, electrically inert substrate disposed on the second surface of the separator.

21 Claims, 2 Drawing Sheets

(56) References Cited

U.S. PATENT DOCUMENTS

2014/0059820 A1     3/2014   Wright et al.
2015/0221981 A1*   8/2015   Lee .................... H01M 10/056
                                                                       429/317

\* cited by examiner

THIN FILM RESERVE BATTERY

TECHNICAL FIELD

This disclosure relates generally to thin film batteries and to related subassemblies, systems, and methods.

BACKGROUND

Thin-film batteries have uses in flexible and printed electronics, wearable devices, and other applications. Two broad categories of thin-film batteries are lithium-based and non-lithium based batteries. The former can have higher capacities, but require excellent encapsulation. The latter are generally lower performing and lower cost.

BRIEF SUMMARY

Some embodiments are directed to a single-electrode battery subassembly that includes a separator comprising an electrolyte. The separator has a first surface and an opposing second surface. A single electrode is disposed over the first surface of the separator. A removable, electrically inert substrate disposed on the second surface of the separator.

According to some embodiments, a method of making a battery includes forming a battery subassembly. To form the battery subassembly, a separator is formed comprising an electrolyte on a removable, non-electrically active substrate such that a first surface of the separator is adjacent the substrate. A first electrode is formed on a second surface of the separator. The substrate is removed from the first surface of the separator. The first surface of the separator is placed on a second electrode.

Some embodiments involve a thin film battery. The thin film battery includes a separator comprising an electrolyte. The separator has a first surface and an opposing second surface. A support is adjacent to and mechanically attached to the separator. A first electrode is disposed over the first surface of the separator. A second electrode is disposed over the second surface of the separator and the support. A via extends through the support and makes electrical contact with the second electrode.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments disclosed herein relate to thin film reserve batteries such as those having non-lithium active materials. One challenge with thin film batteries, especially printed batteries, is limited shelf life. Parasitic reactions between the electrode materials and the electrolyte tend to degrade the battery over time during storage. One means to address this challenge is to store the battery in an incomplete form and complete the battery when (or close to when) it is deployed. This can prevent or reduce parasitic reactions. Batteries that are stored in incomplete form are referred to herein as "reserve batteries."

Embodiments disclosed herein are directed to subassemblies for reserve batteries. According to various embodiments, the subassembly is a single electrode component that omits one electrode material, e.g., the anode material, needed to make the battery operate until the time of deployment. Without the anode, the battery comprises a separator containing electrolyte and a cathode.

Figure 1:
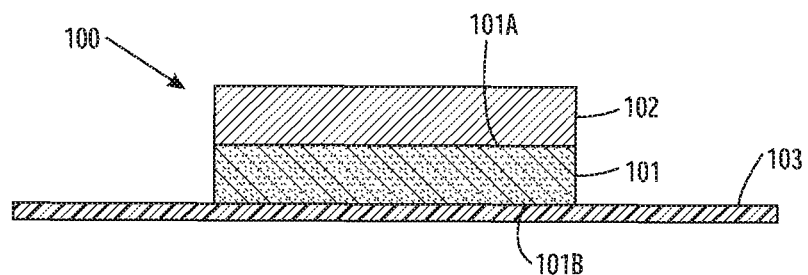
FIG. 1 shows a cross sectional view of a battery subassembly in accordance with some embodiments.

FIG. 1 is a cross sectional diagram of a battery subassembly 100 according to some embodiments. The subassembly 100 includes a single electrode 102 and is not capable of functioning as a battery due to omission of a second electrode of the battery.

The subassembly 100 includes a separator 101 that includes electrolyte, the separator 101 has a first surface 101a and an opposing second surface 101b. In some embodiments, the separator includes only the electrolyte and in some embodiments, the separator includes the electrolyte along with additional materials. The electrolyte may comprise one or more of KOH, $ZnCl_2$, an ionic liquid, and any other suitable materials. The electrolyte may be a solid, liquid or a gel. In some implementations, the separator comprises an electrolyte that may be supported by a mesh, such as a polymer mesh. Support for the electrolyte may be provided by paper wherein the electrode is soaked into the paper. The electrolyte may include one or more additives, such as $ZnO_2$, that enhance battery performance.

The single electrode 102, e.g. comprising a cathode material such as $MnO_2$, is disposed over the first surface 101a of the separator 101. In some embodiments, the electrode 102 includes a conductivity enhancer which may comprise carbon and/or other conductive materials. In some embodiments, the single electrode 102 may be an air cathode that comprises a catalyst and a conductivity enhancer. According to some implementations, the catalyst comprises $MnO_2$ and the conductivity enhancer comprises porous carbon that enhances conductivity and allows air to enter the air cathode.

The second surface 101b of the separator 101 is disposed on a removable substrate 103 comprising a non-electrically active material such as a polymer, a plastic, or paper. The removable substrate 103 may be flexible and/or peelable so that it may be removed from the separator 101 by peeling the substrate 103 away from the separator 101.

Figure 2:
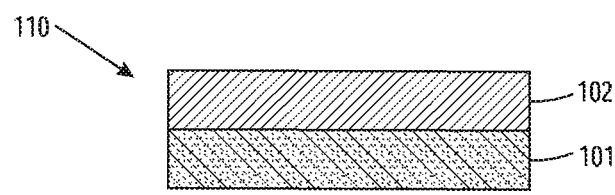
FIG. 2 shows a cross sectional view of the battery subassembly of FIG. 1 with the substrate removed.
Figure 3:
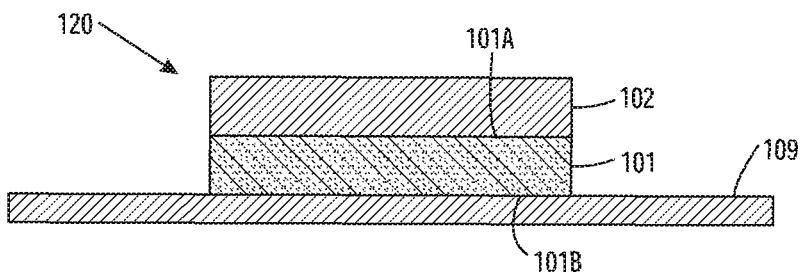
FIG. 3 is a cross sectional view of a battery that is formed from the battery subassembly of FIG. 1 after the substrate is removed and the second electrode is attached.

FIG. 2 is a cross sectional view showing a battery subassembly 110 after the substrate 103 of FIG. 1 has been removed. FIG. 3 is a cross sectional view showing a battery 120 formed by adding a second electrode 109 to the subassembly 100 shown in FIG. 1 after removal of the substrate 103. The second electrode 109 may be an anode electrode and can comprise a metal material, such as a metal foil, for example.

In some embodiments, the battery subassembly and battery includes a current collector support. The current collector support can also facilitate making contact between the second electrode (anode) of the battery and a current collector. In some implementations, electrical connection access to both the anode and cathode of the battery is available from one side of the battery. In alternative embodiments, one or both of the anode and the cathode are accessible from only one side of the completed battery.

Figure 4:
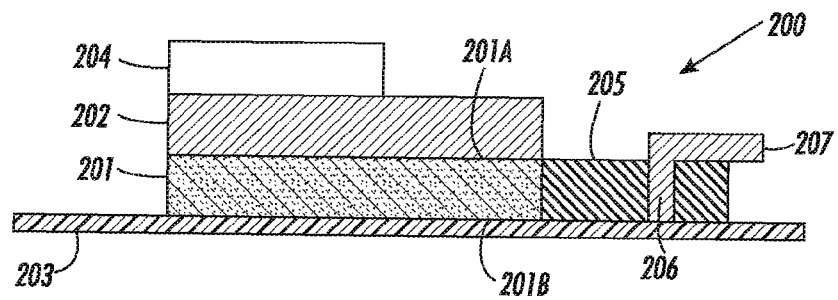
FIG. 4 shows a cross sectional view of a battery subassembly in accordance with some embodiments.

FIG. 4 illustrates a cross sectional diagram of a battery subassembly 200 according to some embodiments. The subassembly 200 comprises a separator 201 that includes electrolyte, the separator 201 has a first surface 201a and an opposing second surface 201b. The electrolyte may be one or more of KOH, $ZnCl_2$, an ionic liquid, and any other material. The electrolyte may be a solid, liquid or a gel. In some implementations, the electrolyte may be supported by a mesh provided by a polymer or paper. The electrolyte may include an additive that enhances battery performance, e.g., $ZnO_2$.

A single electrode 202, e.g. comprising a cathode material such as $MnO_2$, is disposed over the first surface 201a of the separator 201. A current collector, e.g., cathode current collector 204, may be disposed on the cathode 202 such that the cathode 202 is between the separator 201 and the cathode current collector 204.

In some embodiments, the electrode 202 includes a conductivity enhancer which may comprise carbon and/or other conductive materials. As previously discussed, the single electrode 202 may be an air cathode comprising a catalyst and a conductivity enhancer. According to some implementations, the catalyst comprises $MnO_2$, the conductivity enhancer may comprise a porous carbon that allows air to enter the air cathode.

The second surface 201b of the separator 201 is disposed on a removable substrate 203 which may be made of a non-electrically conductive material such as a polymer, a plastic, or paper. The removable substrate 203 may be flexible and/or may be removable from the separator 201 by peeling and/or by other removal processes.

As shown in the cross section of FIG. 4, the subassembly 200 may include a current collector support 205 disposed on the substrate 203 adjacent the separator 201. The current collector support 205 may be made of a non-electrically active material such as a polymer film. In some implementations, the current collector support 205 includes one or more electrically conductive vias 206 through the current collector support 205. The via 206 is electrically connected to a current collector 207 for a second electrode (not shown in FIG. 4 but shown in FIG. 6).

Figure 5:
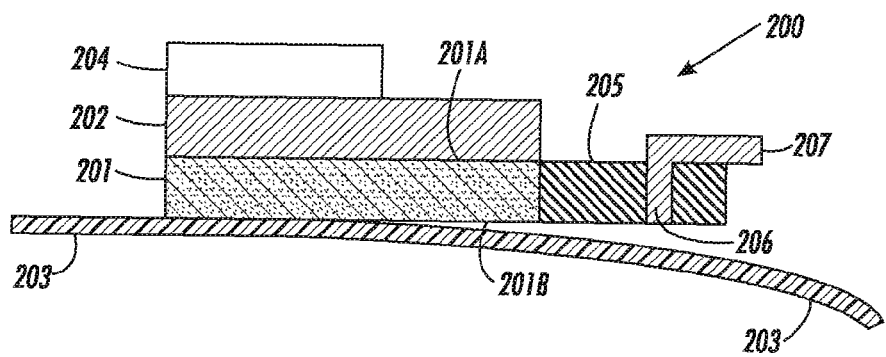
FIG. 5 shows a cross sectional view of the battery subassembly of FIG. 4 with the substrate in the process of being peeled off the separator.
Figure 6:
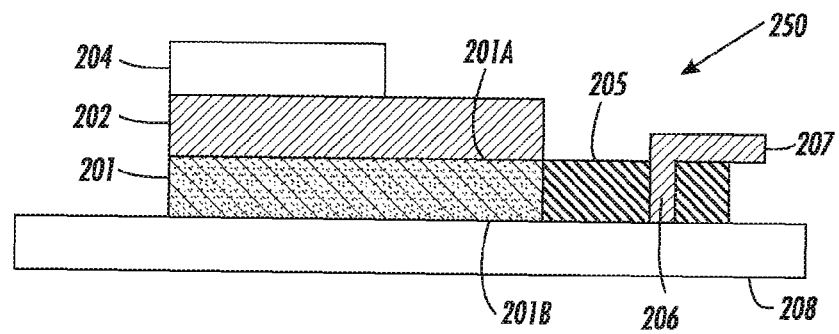
FIG. 6 is a cross sectional view of a battery that is formed from the battery subassembly of FIG. 4 after the substrate is removed and the second electrode is attached.

FIG. 5 is a cross sectional view showing a battery subassembly 200 with the substrate 203 in the process of being removed by peeling the substrate 203 away from the separator 201. FIG. 6 is a cross sectional view showing a battery 250 formed by adding a second electrode 208, e.g., the anode electrode, to the subassembly 200 shown in FIG. 5 after the substrate 203 has been removed. The via 206 makes contact between the second electrode 208 and the current collector 207.

A method of making a thin film battery includes forming a separator comprising an electrolyte on a removable, non-electrically active substrate wherein the separator has a first surface and an opposing second surface and the first surface is disposed adjacent to the substrate. A first electrode, e.g., the cathode electrode, is formed on the second surface of the separator. The electrolyte can be of any known battery chemistry. The embodiments disclosed herein are not intended to be limited to any particular chemistry, but can apply to a wide range of thin film batteries. For example, the electrolyte can be KOH, $ZnCl_2$, an ionic liquid, or any other known ionically conductive material. The electrolyte can be supported in a mesh, such as a polymer mesh, or soaked into paper. It can be mixed with polymer so that it is a gel, or may be any other suitable form. It can contain additives to improve battery performance, such as $ZnO_2$ in some implementations.

Likewise the first electrode, e.g., cathode electrode, can be of any suitable material, for example $MnO_2$. The cathode material can contain conductivity enhancers, for example, comprising carbon, and/or other additives. The subassembly may include a current collector, e.g., a conductive layer configured to conduct current, disposed on and electrically connected to the first electrode. Alternatively, the current collector for the first electrode may be added at the time of the battery deployment.

According to some embodiments, the cathode can be an air-cathode, as in a Zn-air battery. Such a cathode may contain a catalyst, such as $MnO_2$, and a conductive support, such as carbon. The conductive support may be porous allowing air to enter through the conductive support and react with the electrolyte.

The battery described herein may be constructed using thin film processes to be a thin sheet. In a subassembly of the battery, the anode is omitted and the separator is directly on a substrate, which can be plastic, paper, or some other flexible material. Upon deployment of the battery, the substrate is removed from the separator, for example by peeling, and the separator is disposed on and/or attached to a second electrode, e.g., comprising anode material. One or more components of the battery, including the separator, the first electrode, the second electrode, the separator, and/or the first and second current collectors can be formed by printing.

In some embodiments, the second electrode, e.g., anode, may be or comprise a metal foil, such as a zinc or aluminum foil. In some embodiments the second electrode may be an existing metal surface, such as a metal surface of furniture, a wall, an appliance, and/or a metal surface of an electronic device for which the battery is used to provide power. The surface of the metal foil or other metal surface may be prepared before it contacts the surface of the separator. It may be necessary to prepare the foil or surface prior to activating the battery, for example to remove an oxide layer or other coating. Preparation can be physical (e.g., scratching or scraping), or chemical (e.g., etching with acid).

In some embodiments, the method includes forming a current collector support on the substrate adjacent to the separator. In some implementations, the current collector support is a non-electrically active material such as a polymer film. Forming the current collector comprises forming one or more vias through the current collector support. After the second electrode is applied to the separator and the current collector support, the vias contact the second electrode and electrically connect the second electrode with a current collector.

The battery is activated by applying and/or attaching the separator to the metal foil or surface of the second electrode. For example, applying the separator to the second electrode may comprise placing the separator on the second electrode or placing the second electrode on the separator. Electrical contact between the anode and cathode electrodes (and/or current collectors) of the battery and the electrical circuit that the battery will power must be made. How the electrical contact is implemented can depend on the application. In some embodiments, both the anode and the cathode are accessible from one side of the battery. As discussed above and shown in FIGS. 4 through 6 one option is to have an electrical path (one or more vias) through a battery support. Having the current path built in may simplify deployment of the battery in the electrical circuit.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A single-electrode thin film battery subassembly, comprising:
    a separator comprising an electrolyte, the separator having a first surface and an opposing second surface;
    a single electrode disposed over the first surface of the separator;
    a removable, electrically inert substrate disposed on the second surface of the separator; and
    a support disposed on the substrate adjacent the separator, wherein the support includes an electrically conductive via connected to a current collector for a second electrode.

2. The subassembly of claim 1, wherein the single electrode comprises a cathode electrode.

3. The subassembly of claim 1, wherein the subassembly is incapable of functioning as a battery due to omission of an anode of the battery.

4. The subassembly of claim 1, wherein the removable substrate is a flexible, peelable substrate.

5. The subassembly of claim 1, wherein the removable substrate comprises at least one of plastic and paper.

6. The subassembly of claim 1, wherein the electrolyte comprises one or more of KOH, $ZnCl_2$, and an ionic liquid.

7. The subassembly of claim 1, wherein the electrolyte comprises a gel.

8. The subassembly of claim 1, wherein the separator comprises an electrolyte supported by paper or a polymer mesh.

9. The subassembly of claim 1, wherein the electrolyte includes $ZnO_2$ as an additive.

10. The subassembly of claim 1, wherein the single electrode is a cathode comprising $MnO_2$.

11. The subassembly of claim 1, wherein the support is a polymer film.

12. The subassembly of claim 1, further comprising a current collector disposed on the single electrode.

13. The subassembly of claim 1, wherein the single electrode is an air cathode.

14. The subassembly of claim 13, wherein the air cathode comprises a catalyst and a conductivity enhancer.

15. A method of making a battery comprising:
    forming a battery subassembly comprising:
        forming a separator comprising an electrolyte on a removable, non-electrically active substrate such that a first surface of the separator is adjacent the substrate;
        forming a first electrode on a second surface of the separator, wherein at least one of forming the separator and forming the first electrode comprises printing at least one of the separator and the first electrode;
        removing the substrate from the first surface of the separator; and
        disposing the first surface of the separator on a second electrode.

16. The method of claim 15, wherein the first electrode is a cathode of the battery and the second electrode is an anode of the battery.

17. The method of claim 15, further comprising forming a support on the substrate adjacent to the separator.

18. The method of claim 17, wherein forming the support comprises forming a via through the support that contacts the second electrode and electrically connects the second electrode with a current collector.

19. The method of claim 15, wherein disposing the first surface of the separator on the second electrode comprises applying a metal to the first surface of the separator.

20. The method of claim 19, further comprising surface treating the metal before applying the metal to the first surface of the separator.

21. A thin film battery comprising:
    a separator comprising an electrolyte, the separator having a first surface and an opposing second surface;
    a support adjacent to and mechanically attached to the separator;
    a first electrode disposed over the first surface of the separator;
    a second electrode disposed over the second surface of the separator and the support; and
    a via through the support that makes electrical contact with the second electrode.

* * * * *